United States Patent [19]
Toyonaga et al.

[11] Patent Number: 5,852,269
[45] Date of Patent: Dec. 22, 1998

[54] METHOD AND INSTRUMENT FOR DETERMINING POSITION WIRE ELECTRODE IS IN CONTACT WITH WORKPIECE

[75] Inventors: Tatsuo Toyonaga; Yuji Kaneko, both of Kanagawa, Japan

[73] Assignee: Sodick Co., Ltd., Japan

[21] Appl. No.: 809,414

[22] PCT Filed: Nov. 11, 1996

[86] PCT No.: PCT/JP96/03309

§ 371 Date: Jul. 28, 1997

§ 102(e) Date: Jul. 28, 1997

[87] PCT Pub. No.: WO97/18052

PCT Pub. Date: May 22, 1997

[30] Foreign Application Priority Data

Nov. 11, 1995 [JP] Japan ................................... 7-317536

[51] Int. Cl.[6] .................................................. B23H 7/10
[52] U.S. Cl. ........................................................ 219/69.12
[58] Field of Search ........................... 219/69.12; 324/559

[56] References Cited

U.S. PATENT DOCUMENTS

| | | | |
|---|---|---|---|
| 5,003,147 | 3/1991 | Kawanabe et al. ................... | 219/69.12 |
| 5,170,026 | 12/1992 | Suga et al. ............................ | 219/69.12 |
| 5,254,826 | 10/1993 | Kimura et al. ....................... | 219/69.12 |
| 5,744,775 | 4/1998 | Yasuda et al. ....................... | 219/69.12 |

FOREIGN PATENT DOCUMENTS

| | | | |
|---|---|---|---|
| 63-134124 | 6/1988 | Japan ................................. | 219/69.12 |
| 64-40218 | 2/1989 | Japan ................................. | 219/69.12 |
| 1-205927 | 8/1989 | Japan ................................. | 219/69.12 |
| 1-246019 | 10/1989 | Japan ................................. | 219/69.12 |
| 2-298432 | 12/1990 | Japan ................................. | 219/69.12 |
| 1174195 | 8/1985 | U.S.S.R. ............................ | 219/69.12 |
| 94/02278 | 2/1994 | WIPO ................................. | 219/69.12 |

*Primary Examiner*—Geoffrey S. Evans

[57] ABSTRACT

A contact position measurement method including moving either a wire-shaped tool electrode or a workpiece relative to the other within a plane, and causing the wire to approach a reference position on the workpiece; applying a voltage between the wire and the workpiece with the wire oriented perpendicular to the plane; detecting contact between the workpiece reference position and the wire; placing the workpiece reference position generally at the center of vibration of the wire, determined in accordance with the number of occurrences of detected contact; generating coordinate data indicating the position of the wire with respect to the workpiece; and determining the position of contact based on the coordinate data.

6 Claims, 13 Drawing Sheets

METHOD AND INSTRUMENT FOR DETERMINING POSITION WIRE ELECTRODE IS IN CONTACT WITH WORKPIECE

FIELD OF THE INVENTION

The present invention relates to a wire cut electrical discharge machining method and device for machining of a workpiece by electrical discharges using a wire-shaped tool electrode. In particular, the present invention relates to a method and device for measuring a contact position by causing a wire electrode to contact a workpiece and for detecting the resulting electrical contact.

BACKGROUND OF THE INVENTION

A wire cut electrical discharge machining device is known which forms a desired profile in a workpiece in a manner analogous to a band saw, but which operates by generating electrical discharges between a wire-shaped tool electrode which travels between a pair of wire guides and the workpiece to be machined. This wire cut electrical discharge machining device is appropriate for precision forming of a desired profile in the workpiece to be machined.

Before electrical discharge machining, the workpiece and the wire electrode are mounted in the machine. Generally, the workpiece is affixed to a work stand placed on an XY table in such a way that its top surface can be oriented parallel to the XY plane. The wire electrode is oriented to travel in a direction perpendicular to the XY plane by means of a pair of wire guides. The position of the workpiece reference surface with respect to the wire electrode is then determined. In many cases, this reference surface is assigned to be a polished side of the workpiece which is parallel to the wire electrode axis. In general, the wire electrode is brought into contact with the workpiece reference surface while a voltage is applied between the workpiece and the wire electrode, which is oriented perpendicular to the XY plane, and the contact position is measured by detection of their electrical contact. The applied voltage may be an AC or a DC voltage of from several volts to several 10 s of volts.

Figure 14:
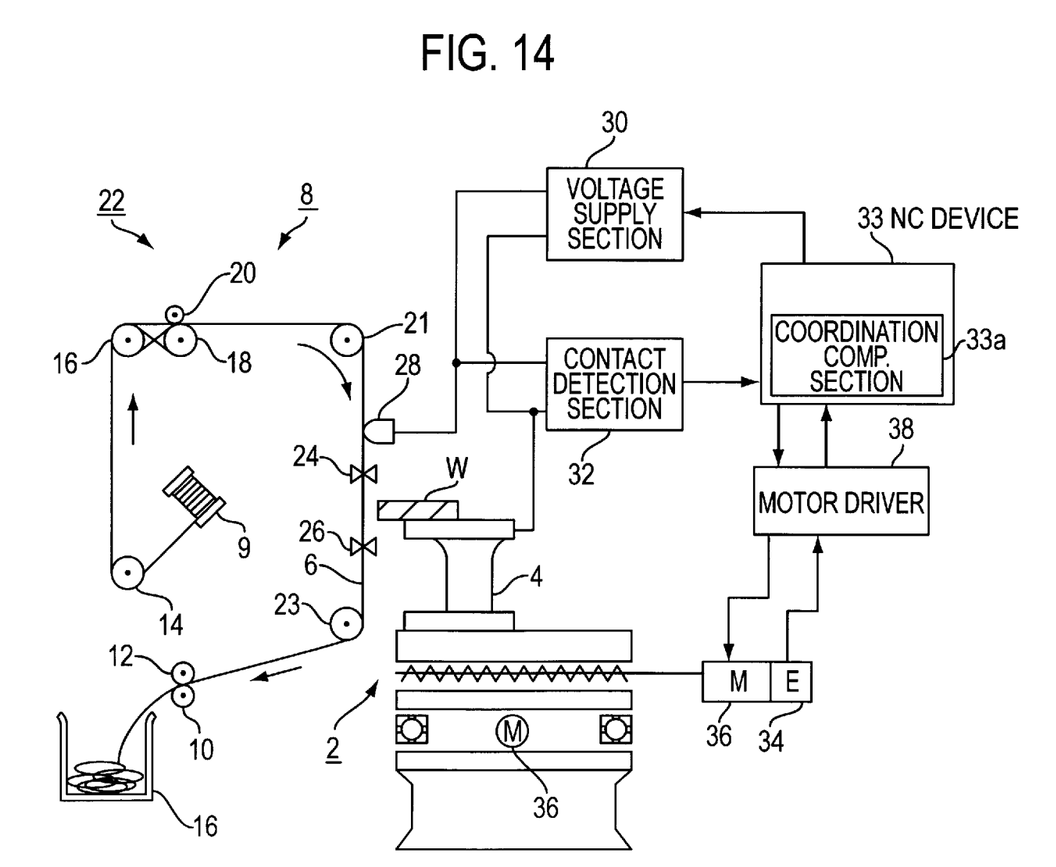
FIG. 14 is a schematic depiction of a conventional device for measuring the contact position of a wire electrode and a workpiece in a wire cut electrical discharge machining device.

A conventional device for measuring the position of the contact point in a wire cut electrical discharge machining device will now be explained, with reference to FIG. 14.

A workpiece W is affixed to the top surface of work stand 4, which is provided on XY table 2, and is capable of moving in the mutually orthogonal X and Y directions. A wire supply device 8 is provided which provides wire electrode 6 from a bobbin 9 along a specified transport path to an appropriate recovery bucket 16. The wire supply device 8 includes a pair of rollers 10 and 12, which are provided in the vicinity of the recovery bucket 16, and which pull the wire electrode 6. In addition, the wire supply device 8 includes multiple pulleys and a tensioning device which impart a specified tension to the wire electrode 6. In the illustrated wire cut electrical discharge machining device, after the wire electrode 6 is unwound from the bobbin 9 it passes through a guide pulley 14 and is fed to a tension applying device 22 which includes a pulley 16', a powder brake 18, and a pinch roller 20. In addition, the wire electrode passes through a guide pulley 21, a pair of wire guides 24 and 26 respectively arrayed above and below a workpiece W, a guide pulley 23, and a pair of rollers 10 and 12, and is fed to the recovery bucket 16.

A feeder 28, which provides a current for the wire electrode 6, is placed in contact with the wire electrode 6 between the guide pulley 21 and an upper wire guide 24. The feeder 28 is connected to the voltage supply section 30 which applies a voltage to the "gap" formed between the wire electrode 6 and the workpiece W, and to the contact detection section 32, which detects contact between the wire electrode 6 and the workpiece W. The voltage supply section 30 and contact detection section 32 are respectively connected to the upper portion of an electrically conductive work stand 4. The contact detection section 32 detection signal is supplied to an NC device 33, which includes a microcomputer. That NC device 33 controls the entire wire cut electrical discharge machining system. Application of a voltage from the voltage supply section 30 to the gap is also controlled by the NC device 33. The NC device 33 controls the position of the wire electrode 6 with respect to the workpiece W by supplying an instruction requesting motion by the XY table 2 to the motor driver 38 connected to the X-axis and Y-axis motors 36 which drive the XY table 2. Also, the NC device 33 receives feedback information which indicates the degree of movement of the XY table 2 from the encoders 34 respectively attached to the X-axis and Y-axis motors 36. The coordinate calculation section 33a contained in the NC device 33 computes a coordinate corresponding to the current position. This coordinate may also be displayed by a display device (not shown) connected to the NC device 33. The NC device 33 contains a memory device which stores a program for determining contact position.

An example of the process for measuring contact position will now be explained with reference to FIG. 15.

A program for implementation of the contact position measurement operation is called up from the memory device of the NC device 33, and the process is begun.

Figure 15:
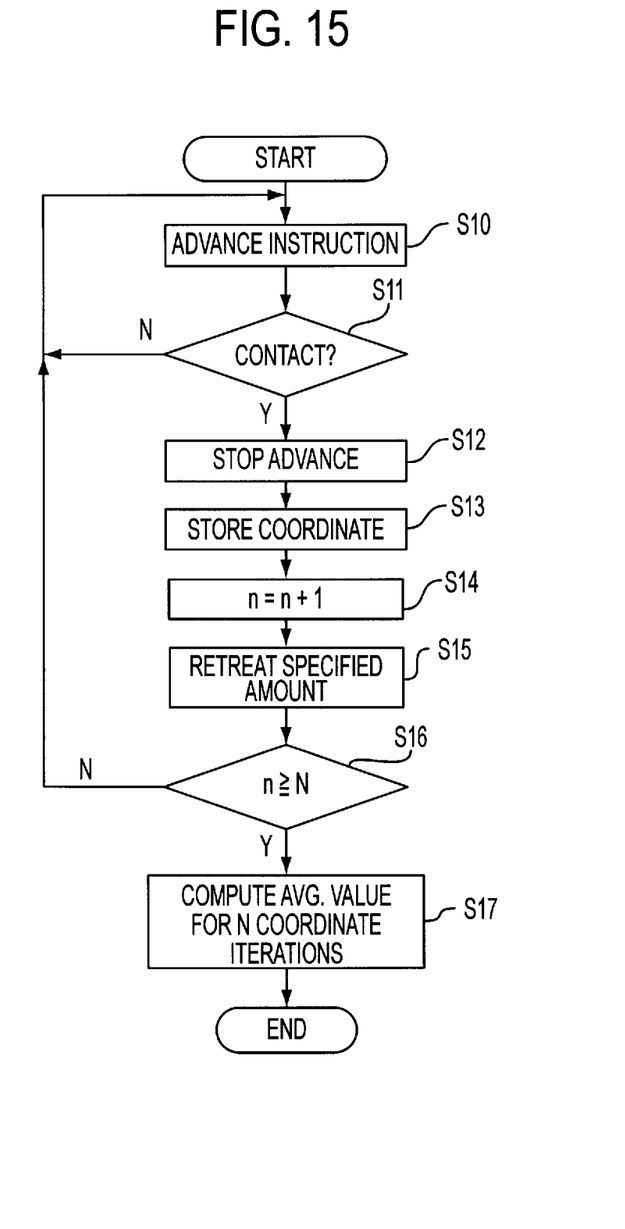
FIG. 15 is a flow chart showing the conventional process for measuring contact position using the device of FIG. 14.

First, the NC device 33 supplies an instruction (step S10) to move the XY table 2 in such a way that either the traveling wire electrode 6 or the workpiece w approaches the other, while a voltage is applied to the "gap." In the wire cut electrical discharge machining device illustrated in FIG. 15, the workpiece W moves toward the wire electrode 6. Next, electrical contact between the wire electrode 6 and the workpiece W is detected (step S11). When the voltage at the gap falls to a specified value, for example to 0 volts, this electrical contact is detected by the contact detection section 32. When electrical contact is detected in step S11, the process advances to step S12. Here, the approach of the workpiece W to the wire electrode 6 is stopped, and the process advances to step S13. When that is not the case, the process returns to step S10. At step S13, the coordinate computation section 33a generates calculable coordinate data which signifies the coordinates of the workpiece W in the XY plane according to feedback information from the encoder 34, and that coordinate data is stored in the NC device 33 memory. The process then advances to step S14. Here the value n, which indicates the number of contacts, increases by 1. This value n is set to "0" at the beginning of the process. Thereafter, the NC device 33 supplies an instruction to back the workpiece W away from the wire electrode 6 by a specified amount (step S15). The process advances to step S16, and here the value n is compared to a set value N which is greater than 1. In step S16, when the value n has reached the set value N, the NC device 33 seeks the average of the stored coordinate data. When this is not the case, the process returns to step S10. The average of the coordinate data is displayed on the display device as the contact position.

It is known that the wire electrode 6, which acts as a contact point for the measurement of position can, for example through fluctuations in tension, vibrate slightly between the pair of wire guides 24 and 26. Thus, the N measurement values may vary greatly depending on wire vibration over several Hz to several KHz.

Also, when fabricating the wire electrode, insulating material such as surfactants and lubricants may be used which can partially adhere to the wire surface. When such wire electrodes are used, electrical contact between the wire electrode and the workpiece may be incorrectly detected.

SUMMARY OF THE INVENTION

An object of the present invention is to provide, in a wire cut electrical discharge machining device, a method and device for measuring the contact position of a wire electrode and a workpiece accurately and in a short time.

A method for measuring the contact position between a wire electrode which forms the tool with a workpiece according to the present invention comprises:

(a) positioning the wire electrode approximately perpendicular to a plane on which either the wire electrode or the workpiece moves with respect to the other;

(b) applying a voltage between the wire electrode and the workpiece;

(c) moving either the wire electrode or the workpiece with respect to the other in the plane, and causing the wire electrode to approach the workpiece base position;

(d) detecting the workpiece base position and wire electrode contact;

(e) positioning the workpiece base position in approximately the center of the wire electrode vibration, in accordance with the number of detected contacts;

(f) generating a coordinate data indicating the position at the wire electrode with respect to the workpiece, and;

(g) seeking the position of the wire electrode with respect to the workpiece when the workpiece base position is located at the center of the wire electrode vibration in accordance with the coordinate data, and determining the contact position.

Preferably, the contact position determination method will include a step categorizing the coordinate data into valid coordinate data and invalid coordinate data, and determining contact position based on the size of valid coordinate data.

Furthermore, preferably the contact position determination method will include obtaining a measure of the variability in coordinate data distribution, and will determine contact position based on that variability.

A device according to the present invention for measuring the contact position between a workpiece assigned to a base position and a wire electrode, where the wire electrode is oriented generally orthogonal to a plane in which either the wire electrode or the workpiece moves with respect to the other, comprises:

a voltage supply means for applying a voltage between the wire electrode and the workpiece;

a contact detection means for detecting contact between the wire electrode and the workpiece;

a movement means for moving either the wire electrode or the workpiece with respect to the other in the plane;

a position control means for controlling the movement means in accordance with the number of detected contacts, such that the base position of the workpiece is caused to be positioned at the center of vibration of the wire electrode;

a coordinate data generation means for generating coordinate data indicative of the position of the wire electrode with respect to the workpiece, and;

a contact position determination means for determining the position of contact between the wire electrode and the workpiece based on the coordinate data.

Preferably, the contact position measurement device includes a means for categorizing coordinate data into valid coordinate data and invalid coordinate data, and for determining the contact position based on the size of the valid coordinate data.

Also, preferably the contact position measurement device includes a means for seeking a measurement of the variability of coordinate data distribution, and for determining contact position based on that variability.

Other objects of the present invention will be partially discussed in the explanation which follows, or will be partially apparent to practitioners of the art through implementation of the invention.

PREFERRED EMBODIMENT OF THE INVENTION

A device according to the present invention for measurement of the contact position between a wire electrode and a workpiece will now be explained below with reference to FIG. 1. The same reference numerals are assigned for those devices which are the same as used in FIG. 14, and an explanation of those elements is omitted.

The NC device 33, which includes a microcomputer, provides an instruction to the motor driver 38 for movement of the XY table 2, and controls the position of the wire electrode 6 with respect to the workpiece W. The NC device 33 includes a coordinate computation section 33a, which receives feedback information indicating movement along the X and Y axes. The coordinate computation section 33a computes coordinates corresponding to the present position of the wire electrode 6 with respect to the workpiece W, and provides that coordinate data to a contact position determination unit 50.

The NC device 33 further comprises a position control section 48 which controls the position of the wire electrode 6 with respect to the workpiece W. The position control section 48 includes counters 44 and 46, which receive signals from the contact detection section 32 indicating the electrical contact state between the workpiece W and the wire electrode 6 at each unit of time, for example each 300 μs. When voltage at the gap goes to a specified value, for example drops to 0V, the contact detection section 32 provides a signal indicating electrical contact. The counter 44 counts the number of occurrences of the signal which indicates contact, while the counter 46 counts the number of non-contact occurrences. When the count of either counter 44 or 46 reaches a specified value, the position control section 48 supplies an instruction requesting movement of the XY table 2 to the motor driver 30.

Furthermore, the NC device 33 includes a contact position determining unit 50 which receives coordinate data from the coordinate computation section 33a. When the contact position determining unit 50 receives an ST_FLG data indicating a "1" from the position control section 48, coordinate data is processed based on the program. The unit 50 categorizes the coordinate data into valid coordinate data and invalid coordinate data, and seeks contact position coordinates based only on the valid coordinate data. When determination of the contact position is completed, the unit 50 supplies END_FLG data indicating a "1." The END_FLG data, which indicates a "1," causes the action of the position control section 48 to end.

Figure 3:
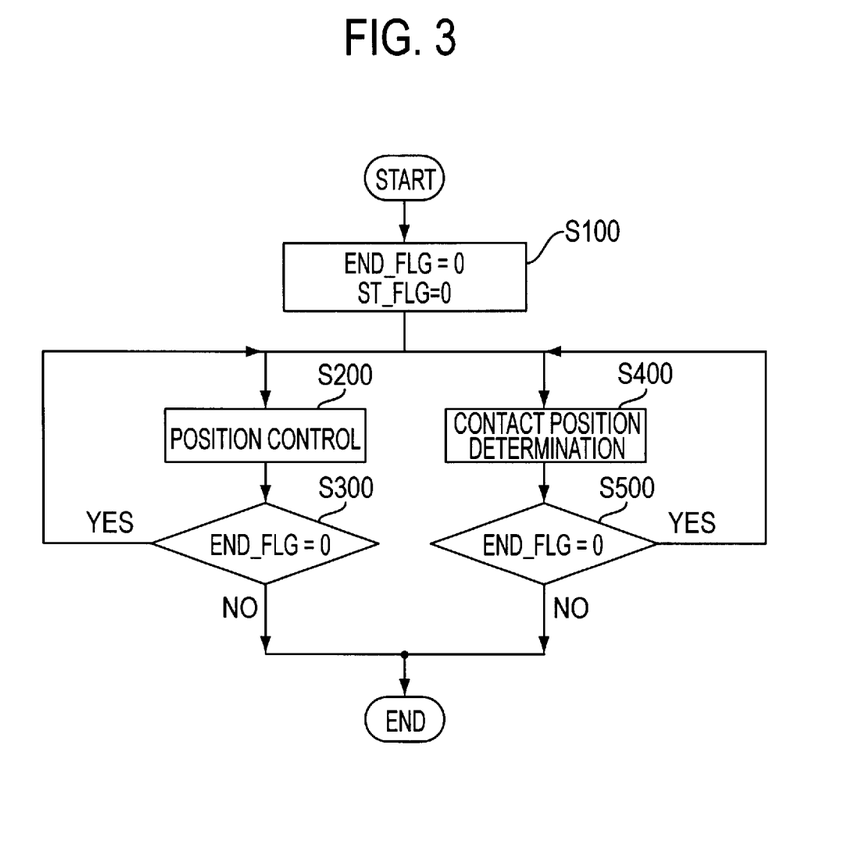
FIG. 3 is a flow chart depicting the process for measuring contact position.

The flow chart in FIG. 3 indicates the process for measuring contact position measurement operation.

When the measurement operation begins, a the ST_FLG and END_FLG data are set to "0" at step S100. Thereafter, the position control section 48 operates (step S200), and the contact position determining unit 50 operates (step S400). When the END_FLG data indicates a "1" at steps S300 and S500, the position control section 48 and the contact position determining unit 50 end their operation. In this manner, the operations of the position control section 48 and the contact position determining unit 50 are processed in parallel by CPU multitasking.

Referring now to FIGS. 4, 5(A), 5(B), and 5(C), the operation of the position control section 48 as executed in step S200 of FIG. 3 will now be explained.

First, at step S201, the counter 46 count CNT_GO and the counter 44 count CNT_BK are respectively set to "0." In addition, the value of F is set, which indicates the feed speed of the motor 36. In the FIG. 4 exemplary embodiment, the value of F is set to "100," and the table 2 moves at a speed of 2 mm per minute. Thereafter, when END_FLG indicates a "0" in step S202, the process advances to step 203. When the output signal from contact detection section 32 indicates electrical contact between the workpiece W and the wire electrode 6 in step S203, the process advances to step S208. When that is not the case, the count CNT_GO increases by 1 in step S204. Following step S204, the count CNT_GO is compared to the set value F in step S205. When the count CNT_GO is smaller than the value F in step S205, the process returns to step S202. In the present example, the time required for the loop comprising steps S202, 203, 204, and 205 is 300 _s. When the count CNT_GO is greater than the value F in step S205, one pulse is supplied to the motor 36 in step S206, and the motor 36 responds to that pulse by advancing the workpiece W toward the wire electrode 6 by a unit distance, for example 1 _m. Therefore when the loop comprising steps S202, 203, 204, and 205 continues for one minute, the workpiece W advances 2 mm toward the wire electrode 6. After step S206, the count CNT_GO is reset in step S207 to "0." At this time, the count CNT_BK may also be reset.

Figure 4:
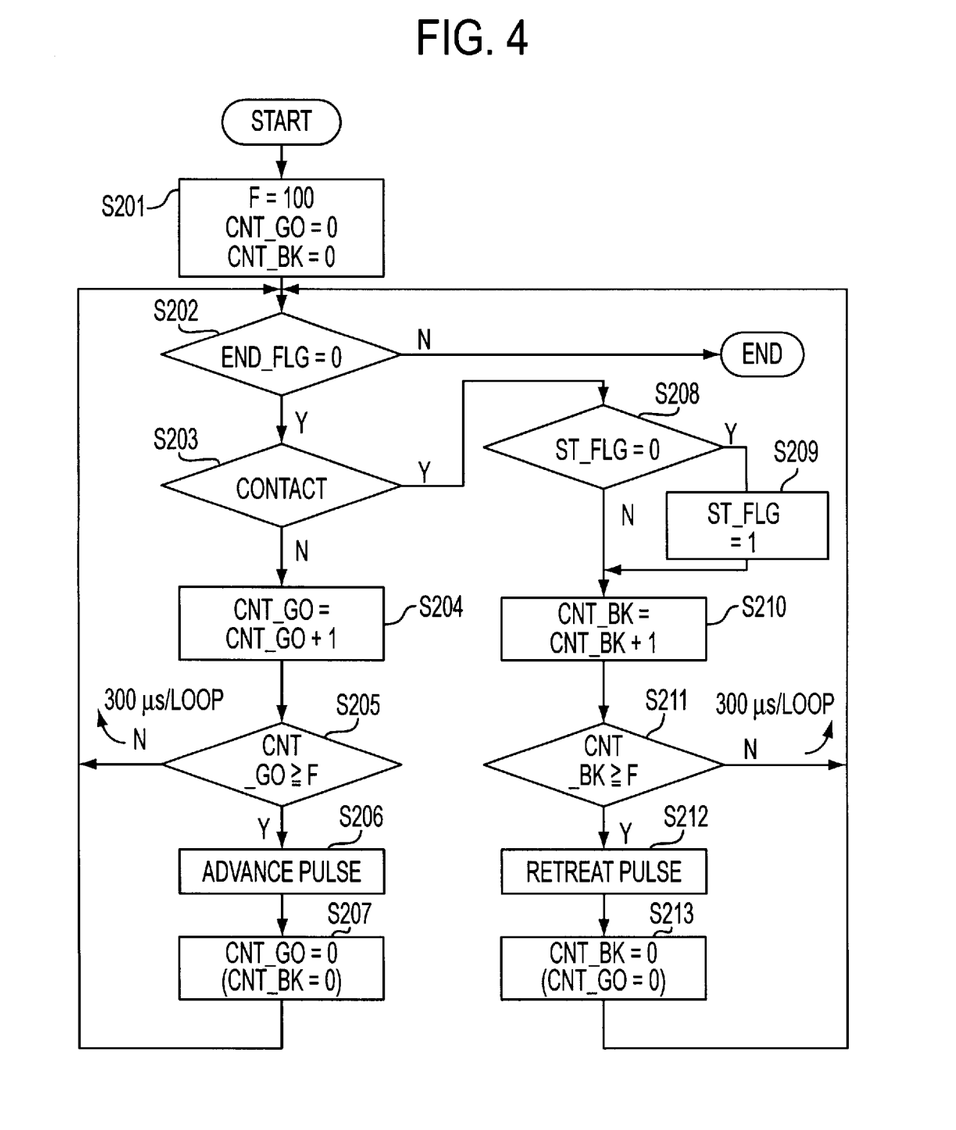
FIG. 4 is a flow chart depicting the action of the position control section in FIG. 1.

When ST_FLG indicates a "0" in step S208, ST-FLG is set to "1" in step S209. When that is not the case, the count CNT_BK is incremented by one in step S210. A "1" indicated by the ST_FLG means the first contact between the workpiece W and the wire electrode 6. Following step S210, the count CNT_BK is compared in step S211 to set value F. When the count CNT_BK is smaller than the value F in step S211, the process returns to step S202. The time required for the loop comprising steps S202, S203, S208, S210 and S211 is 300 _s. When the count CNT_BK in step S211 is greater than the value F, a single pulse is supplied to the motor 36 in step S212, and the motor 36 responds to the pulse by backing the workpiece W away from the wire electrode 6 by a unit distance, for example 1 _m. After step S212, the count CNT_BK is reset to "0" in step S213. At this time, the count CNT_GO may also be reset to "0."

Figure 5A:
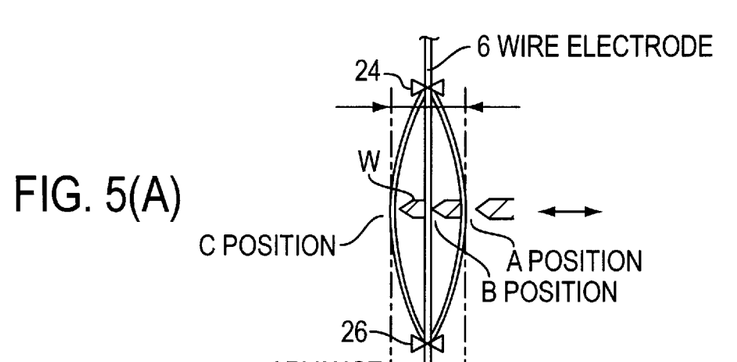
FIG. 5(A) is a diagram illustrating three different positions of the wire electrode with respect to the workpiece.

FIG. 5(A) illustrates three positions A, B, and C of the traveling wire electrode 6, oriented vertically between a pair of wire guides 24 and 26, on either side of the workpiece W. The amplitude of the vibration of the traveling wire electrode 6 is exaggerated in FIG. 5(A). When the wire electrode 6 is in position B, the surface of the wire electrode 6 is at the vibration center, and approximately conforms to the reference surface of the workpiece W. At position A, the wire electrode 6 is further away from the reference surface of the workpiece W than in position B, and contacts the reference surface when the vibration amplitude is at its greatest. In position C, the wire electrode 6 is approaching the reference surface of the workpiece W more than in position B.

Figure 5B:
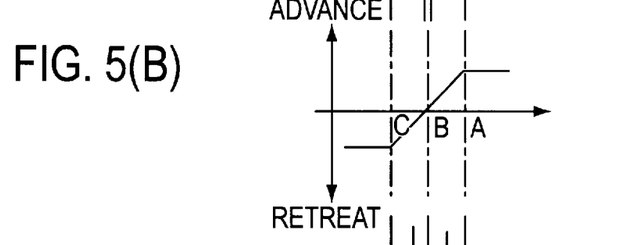
FIGS. 5(B)/(C) are diagrams illustrating the direction and speed of movement of the workpiece with respect to the wire electrode at the three positions illustrated in FIG. 5(A).
Figure 5C:
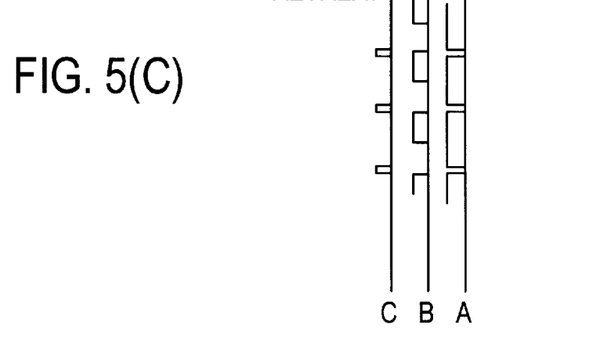

FIG. 5(C) is a timing chart showing the contact detection section 32 output signals for positions A, B, and C respectively. When the wire electrode 6 is in position A, the rate of generation of a low level output signal is high. A low level signal indicates non-contact. In position C, the rate of generation of a high level output signal is high. A high level signal indicates contact. When the wire electrode 6 is in position B, the contact detection section 32 generates a low level and a high level signal at approximately the same rate.

FIG. 5(B) depicts the relationship between the position of the wire electrode 6 and the feed speed of table 2. When the wire electrode 6 is in position A, the position control section 48 causes the workpiece W to advance toward the wire electrode 6 in step S206; when the wire electrode 6 is in position C, it causes the workpiece W to move away from the wire electrode 6 in step S212 shown in FIG. 4. In other words, the position control section 48 controls the position of the workpiece W such that the wire electrode 6 is placed in position B.

Figure 2:
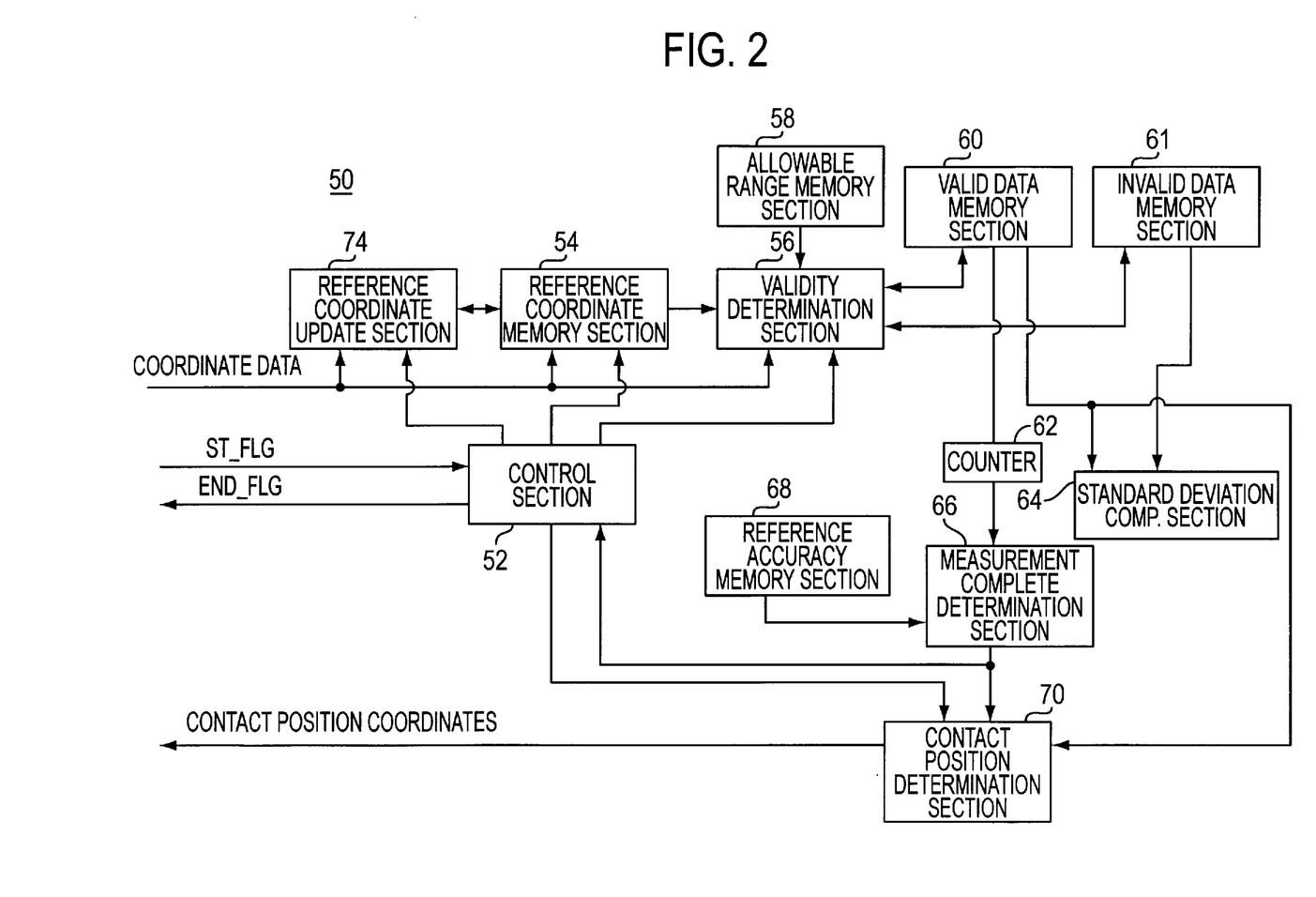
FIG. 2 is a block diagram which illustrates the contact position determination unit in FIG. 1.

The contact position determining unit 50 will now be explained with reference to FIG. 2.

The contact position determining unit 50 includes a control section 52, a reference coordinate memory section 54, a validity determination section 56, a allowable range memory section 58, a valid data memory section 60, and a invalid data memory section 61. The control section 52 controls the entire operation of unit 50 in accordance with a pre-stored program. The ST_FLG data supplied from the position control section 48 is received by the control section 52, and the control section 52 supplies the END_FLG data to the position control section 48. After the control section 52 receives ST_FLG data indicating a "1," the reference coordinate memory section 54 records the first coordinate data received from the coordinate computation section 33a as the reference coordinate. Coordinate data from the coordinate computation section 33a is supplied to the validity determination section 56 in specified time increments under the control of the control section 52. The validity determination section 56 categorizes coordinate data into valid coordinate data and invalid coordinate data based on the reference coordinates and the allowable range stored in the allowable range memory section 58. The valid coordinate data is stored in the valid data memory section 60, while the invalid data is stored in the invalid data memory section 61. The allowable range is set with the amplitude of the wire electrode 6 vibration in mind, and can be changed to a desired value.

Furthermore, the contact position determining unit 50 includes a reference coordinate update section 74, which updates the reference coordinates stored in the reference coordinate memory section 54. When the reference coordinate update section 74 detects coordinate data indicating a position for the wire electrode 6 which is further away from the workpiece W than the position indicated by reference coordinates for possible contact by the wire electrode 6 of the workpiece W, those reference coordinates are replaced by the detected coordinate data.

Also, the contact position determining unit 50 includes a counter 62, a standard deviation computation section 64, a measurement determination section 66, a reference accuracy memory section 68 and a contact position determination section 70. The counter 62 always counts the size of the valid coordinate data stored in valid data memory section 60. The standard deviation computation section 64 uses the coordinate data stored in memory sections 60 and 61 to seek the standard deviation which indicates the distribution variability for that coordinate data. The measurement determination section 66 determines the end of contact position measurement based on the size of the effective data and the standard deviation, and supplies a signal indicating that the measurement operation has ended to the control section 52 and the contact position determination section 70. In the present embodiment, in order to determine the completion of a measurement operation, the measurement determination section 66 uses fuzzy logic to deduce the accuracy of the measurement, and compares that accuracy to the reference value stored in the reference accuracy memory section 68. The contact position determination section 70 is connected to the valid data memory section 60, and seeks coordinates indicating the contact position in accordance with the output signal from the measurement determination section 66.

Figure 6:
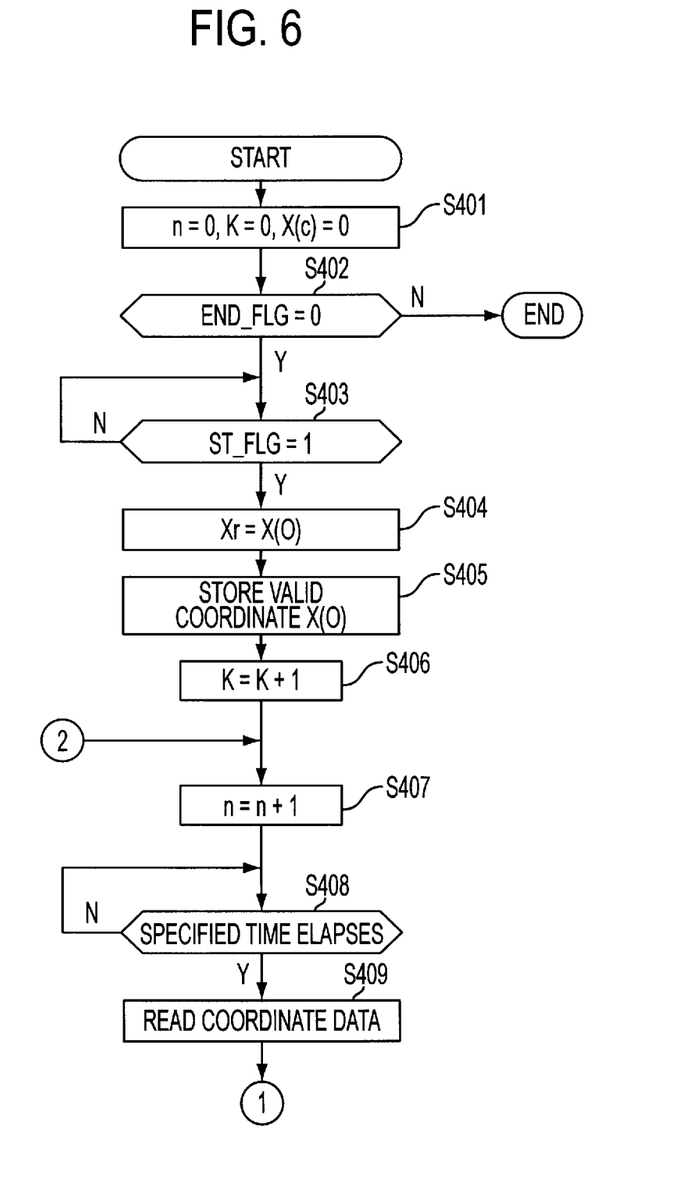
FIG. 6 is a flow chart depicting the operation of the contact position determining unit of FIG. 1.

The operation of the contact position determining unit 50 executed at step S400 in FIG. 3, will now be explained with reference to FIGS. 6 and 7. Step S400 includes, primarily, a part in which coordinate data is categorized into valid coordinate data and invalid coordinate data, a part in which the coordinate data distribution variability is sought, and a part in which the contact position measurement accuracy is deduced based on the size of the valid coordinate data and the coordinate data distribution variability, and the determination to end the measurement operation is made when that accuracy reaches the reference value. At first, in step S401, the value n indicating the size of the coordinate data, and the value K indicating the size of the valid coordinate data are respectively set to "0." Furthermore, the coordinate X(c) for the contact position to be found by the contact position determination section 70 is set to "0." When END_FLG shows a "0" thereafter in step S402, the process advances to step S403. When the control section 52 receives ST_FLG data indicating a "1" from the position control section 48 in step S403, the control section 52 calls for the reference coordinate memory section 54 and the validity determination section 56 to begin coordinate data reception. In step S404, the reference coordinate memory section 54 records the first received coordinate data X(O) as the reference coordinate Xr. The validity determination section 56 supplies that first coordinate data X(O) to the valid data memory section 60, and the valid data memory section 60 records that coordinate data X(O) in step S405. Values K and n then increase by 1 (S406, S407). After a specified time has elapsed as provided in step S408—for example 100 ms—the control section 52 will, in step S409, direct the validity determination section 56 and the reference coordinate update section 74 to receive the next coordinate data. In step S408, instead of the passage of a specified time, it would also be acceptable for the process to advance to step S409 when pulses requesting advance or retreat of the workpiece W have been generated by the position control section 48. After step S409, in step S410 the validity determination section 56 compares the next coordinate data X(n) with the sum of reference coordinate Xr and a value indicating the allowable range T, for example 7 _m. All coordinates increase when the workpiece W advances toward the wire electrode 6. When the coordinate X(n) is smaller than the sum of coordinate Xr and the value T, the validity determination section 56 sends the coordinate data X(n) to valid data memory section 60 in step S412. When this is not the case, the coordinate data X(n) is sent to the invalid data memory section 61 in step S411. After step S412, counter 62 advances count K by one in step S413, and the process advances to step S414. The reference coordinate update section 74 in step S414 compares coordinate data X(n) to the reference coordinate Xr stored in reference coordinate memory section 54. When coordinates X(n) are greater than the reference coordinates Xr, the process advances to step S417. Otherwise, in step S415, the reference coordinate update section 74 replaces the reference coordinate Xr stored in the reference coordinate memory section 54 with coordinate X(n). The validity determination section 56 reviews the valid coordinate data stored in the valid data memory section 60 based on this new reference coordinate Xr (step S416). As a result, data which is newly determined to be invalid is sent to the invalid data memory section 61, and the count K of counter 62 is reduced.

In step S417, the standard deviation computation section 64 seeks a standard deviation S for all the coordinates stored in the memory sections 60 and 61. For example, it seeks the sum of the coordinate data average Xmean and the square of the deviation of each coordinate Xi. i is an integer from 0 to n. The standard deviation S is a positive square root which divides that sum by a value n, and is expressed by the following equation:

$$\text{Standard Deviation } S = \sqrt{\frac{\sum_{i=0}^{n}(Xi - X\text{ mean})^2}{n}}$$

In step S418, the measurement determination section 66 deduces a measurement accuracy Y based on the standard deviation S and the size of the valid coordinate data. In step S419, accuracy Y is compared to the reference value Yr stored in the reference accuracy memory section 68. Reference value Yr is, for example "50," and can be changed to a desired value. When accuracy Y is above a reference value Yr, the measurement determination section 66 supplies a signal to the contact position determination section 70 and the control section 52. In step S420, the contact position determination section 70 seeks a coordinate X(c) corresponding to the contact position, in accordance with the output signal from the measurement determination section 66. Coordinate X(c) is determined based on a calculation of the average of valid coordinate data having a size of value K. This coordinate X(c) is displayed by the display device 72. In step S421, the control section 52 supplies END_FLG data indicating a "1" to the position control section 48 in accordance with the output signal from the measurement determination section 66, and directs the validity determination section 56 and the reference coordinate update section 74 to stop receiving data. As a result, the measurement operation shown in FIG. 3 ends. When the accuracy Y is smaller than the reference value Yr in step S419, the process returns to step S407.

The operation of the measurement determination section 66 will now be explained below with reference to FIGS. 8, 9, 10, and 11.

Figure 8:
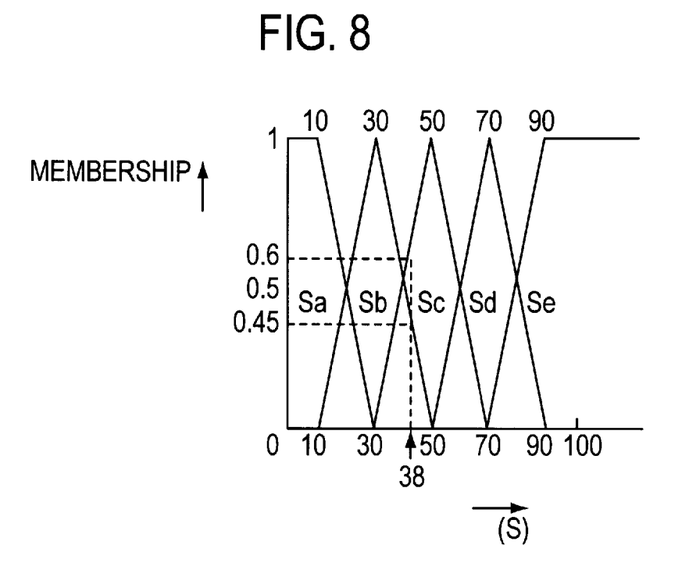
FIG. 8 illustrates an example of the membership functions used in the measurement determination section of the contact position determination unit of FIG. 1.

FIG. 8 illustrates a function which indicates membership with respect to a standard deviation S. In the illustrated embodiment, membership with respect to standard deviation S is defined for 5 groups: Sa, Sb, Sc, Sd, and Se. Sa, Sb, Sc, Sd, and Se indicate the level of standard deviation S; that level grows sequentially larger. For example, when there is a large membership in Se, which is a group which indicates a large variability in the size of standard deviation S, it may be deduced that the measurement of contact position has not reached a high level of accuracy. As is illustrated in FIG. 8, when "38" is sought as the standard deviation, the memberships of Sa, Sb, Sc, Sd, and Se are respectively as follows:
Sa=0
Sb=0.45
Sc=0.5
Sd=0
Se=0

Figure 9:
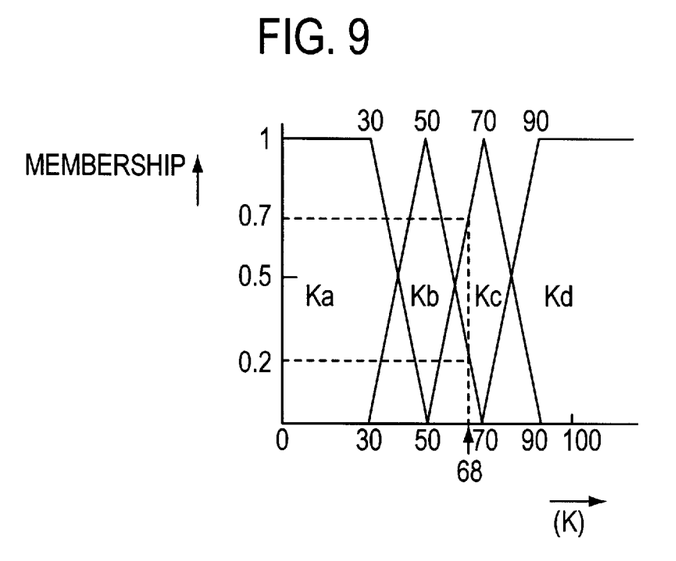
FIG. 9 illustrates another example of the membership functions used in the measurement determination section of the contact position determination unit of FIG. 1.

FIG. 9 illustrates a function indicating membership with respect to the size K of valid coordinate data. In the illustrated embodiment, membership for 4 groups—Ka, Kb, Kc, and Kd—is respectively determined with respect to value K. Ka, Kb, Kc, and Kd indicate the degree of size of value K, and grow sequentially larger. For example, when Kd, which is a group indicating large valid coordinate data, has a large membership, it may be deduced that a high accuracy of contact position measurement has been attained. As is illustrated in FIG. 9, when value K is "68," the memberships of Ka, Kb, Kc, and Kd are respectively as follows:
Ka=0
Kb=0.2
Kc=0.7
Kd=0

Figure 10:
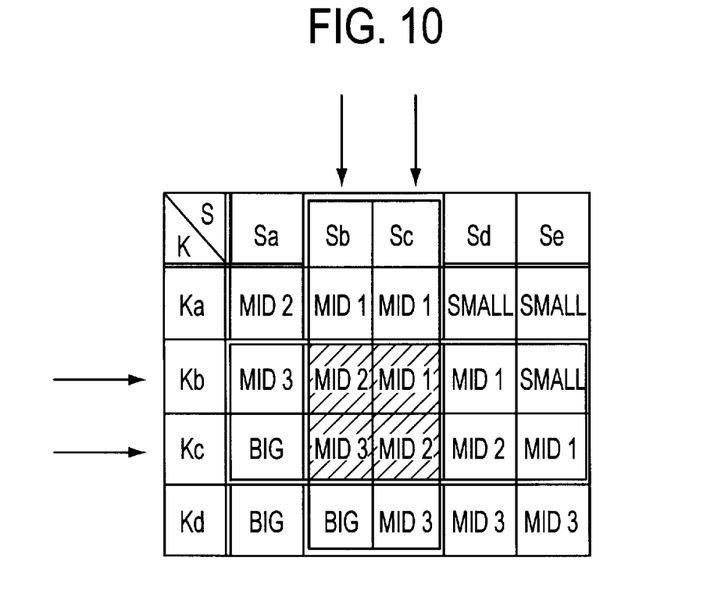
FIG. 10 depicts an example of the fuzzy logic rules used in the measurement determining section of the contact position determination unit of FIG. 1.

Next, based on the rules of fuzzy logic shown in FIG. 10, memberships are sought for five groups, "small," "mid1," "mid2," "mid3," and "big," which indicate the degree of accuracy Y. The level of accuracy Y increases sequentially as "small," "mid1," "mid2," "mid3" and "big." The fuzzy logic rules in FIG. 10 are expressed by the following logic:

| | |
|---|---|
| if S = Sa and K = Ka | then Y = mid2 |
| if S = Sa and K = Kb | then Y = mid3 |
| if S = Sa and K = Kc | then Y = big |
| if S = Sa and K = Kd | then Y = big |
| if S = Sb and K = Ka | then Y = mid1 |
| if S = Sb and K = Kb | then Y = mid2 |
| if S = Sb and K = Kc | then Y = mid3 |
| if S = Sb and K = Kd | then Y = big |
| if S = Sc and K = Ka | then Y = mid1 |
| if S = Sc and K = Kb | then Y = mid1 |
| if S = Sc and K = Kc | then Y = mid2 |
| if S = Sc and K = Kd | then Y = mid3 |
| if S = Sd and K = Ka | then Y = small |
| if S = Sd and K = Kb | then Y = mid1 |
| if S = Sd and K = Kc | then Y = mid2 |
| if S = Sd and K = Kd | then Y = mid3 |
| if S = Se and K = Ka | then Y = small |
| if S = Se and K = Kb | then Y = small |
| if S = Se and K = Kc | then Y = mid1 |
| if S = Se and K = Kd | then Y = mid3 |

Classification as "small," "mid1," "mid2," "mid3," and "big" are thus obtained by the memberships of Sa, Sb, Sc, Sd, and Se, and by the cumulative groups of the respective memberships of Ka, Kb, Kc, and Kd. Sa, Sd, Se, Ka, and Kd are "0," so the region not shaded in FIG. 10 indicates a "0." Membership of "mid2," where Sb and Kb overlap, is expressed by Kb, which has a smaller membership than Sb. In other words, the "mid2" membership takes a "0.2" based on the Kb membership. The membership of "mid2" is indicated by the point Kb in the graph in FIG. 11. The membership of "mid3," where Sb and Kc overlap, is expressed by Sb, which has a membership smaller than Kc. In other words, the membership of "mid3" takes "0.45," based on the membership of Sb. "mid3" membership is expressed by the point Sb in the graph in FIG. 11. Similarly, in the example of FIG. 11, "mid1" membership is indicated by the point Kb, and "mid2" membership is indicated by the point Sc. Thus the "mid1" membership takes "0.2," and the "mid3" membership takes "0.45." Two points are plotted for the "mid2" membership function: Sc ("mid2"="0.6") and Kb ("mid2"="0.2"). In the present embodiment, the sum—which is to say the larger value—of, for example, the two "mid2" memberships is selected. In the exemplary FIG. 11 embodiment, "small," "mid1," "mid2," "mid3," and "big" correspond to Y value accuracies of "5," "15," "35," "55," and "65" respectively. By then multiplying the accuracy Y ("15") corresponding to "mid1" by the "mid1" membership, and further multiplying by the "mid1" weight, (mid1)/(small+mid1+mid2+mid3+big), the value Y(mid1) is obtained. That is, it is obtained by the following equation:

Y(mid1)=35×0.6/(0.2+0.6+0.45)=2.4

Figure 11:
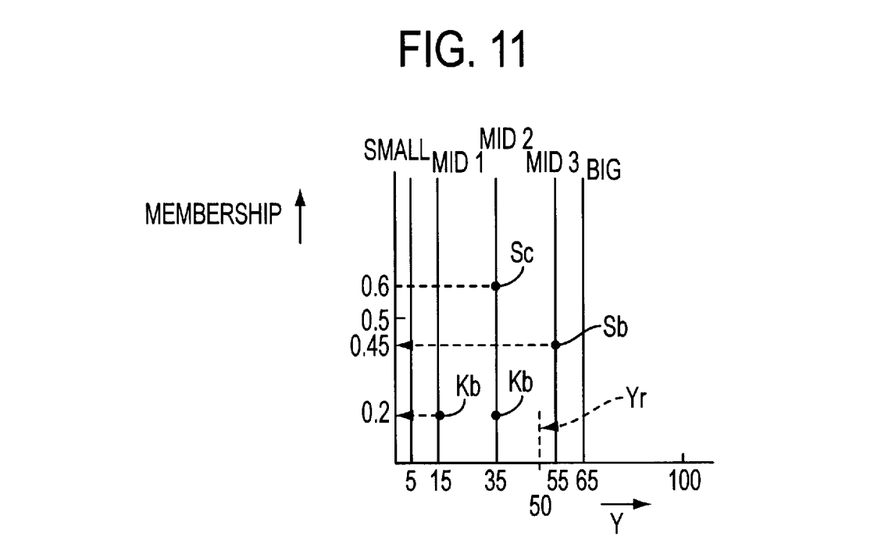
FIG. 11 illustrates an example of the membership function used in the measurement determination section of the contact position determination unit of FIG. 1.

Similarly, Y(mid2) and Y(mid3) are obtained in the following way:

Y(mid2)=35×0.6/0.2+0.6+0.45)=16.8

Y(mid3)=55×0.45/(0.2+0.6+0.45)=19.8

Figure 7:
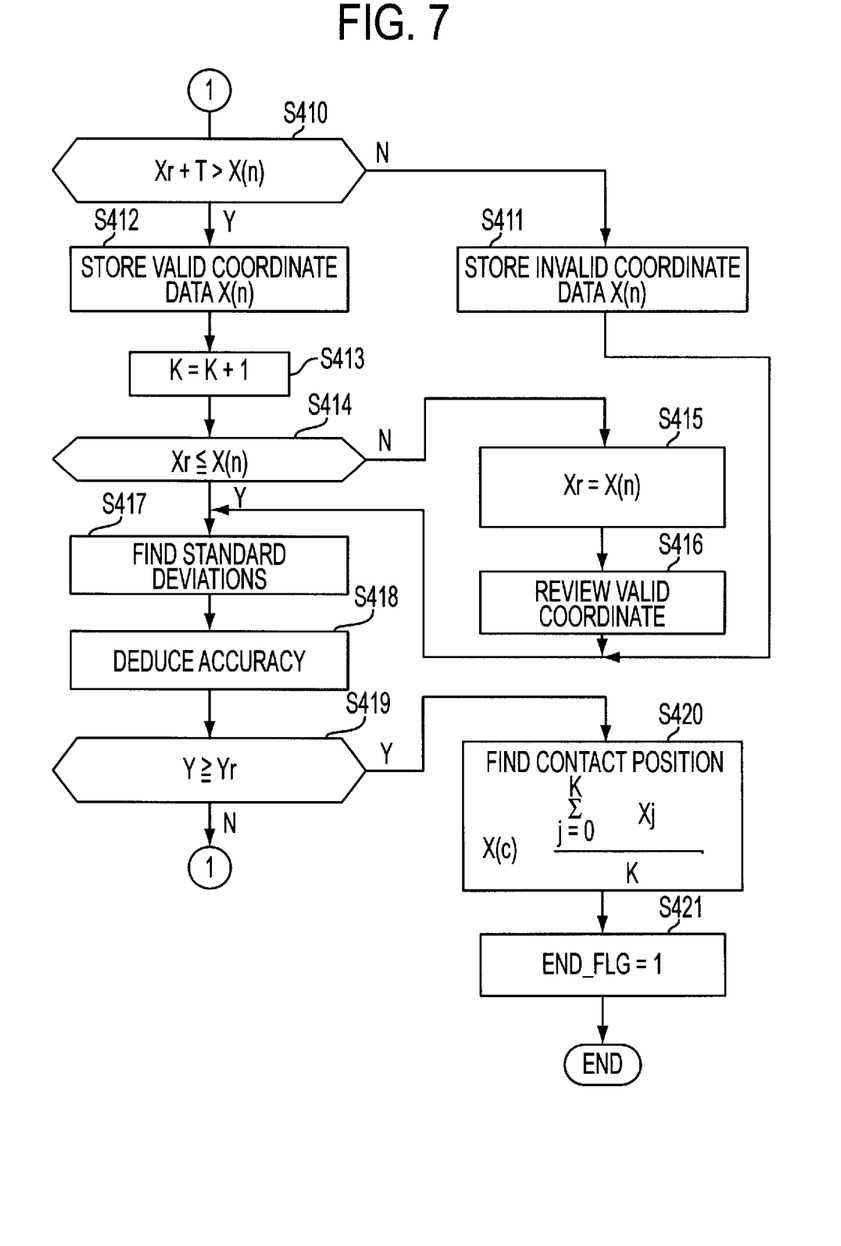
FIG. 7 is a flow chart showing the action of the coordinar computation unit of FIG. 1.

Accuracy Y takes the sum of Y(mid1), Y(mid2) and Y(mid3), or "39." In this example, the Y value is smaller than the reference value Yr "50," so the process in FIG. 7 proceeds from step S419 to step S407.

Figure 1:
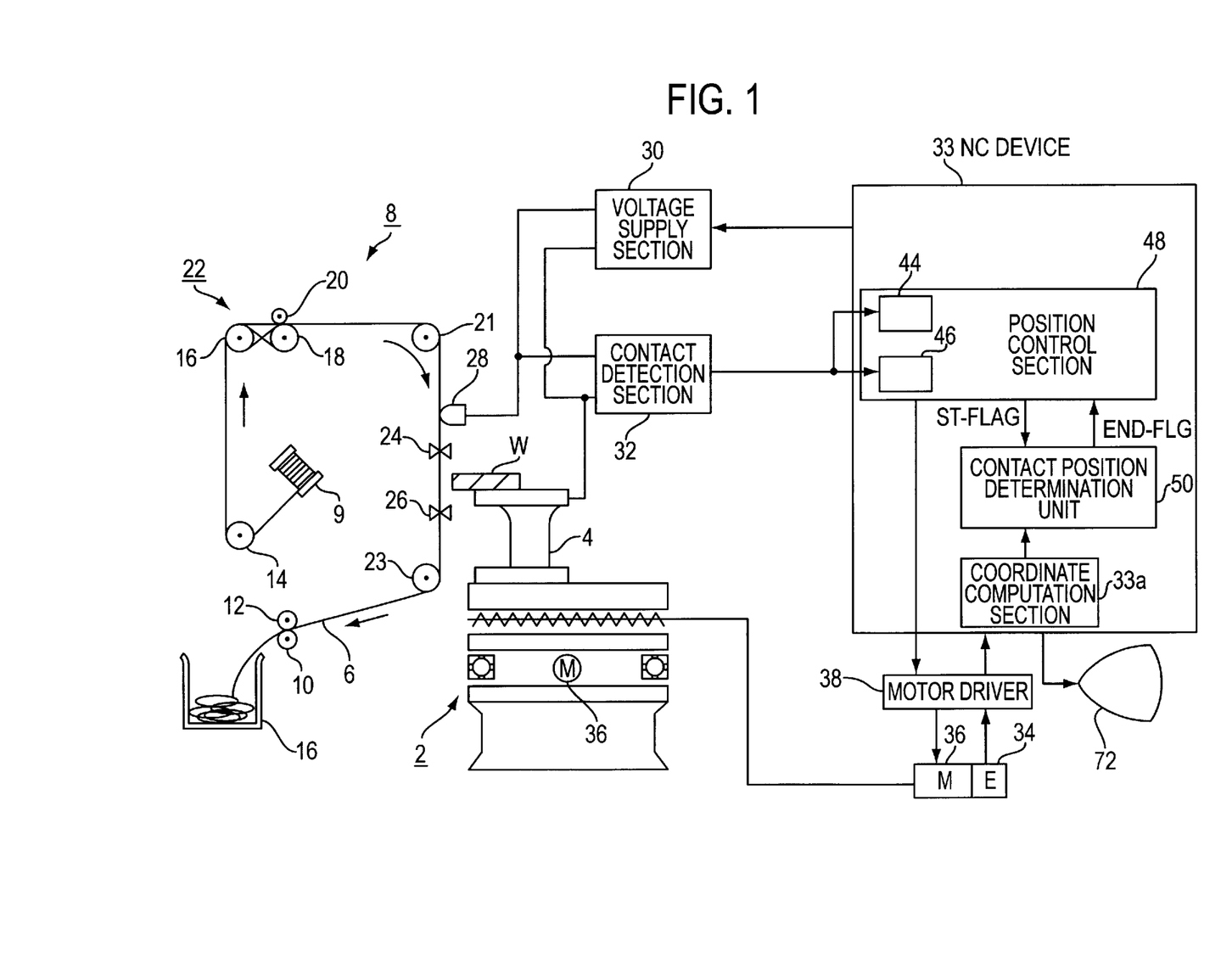
FIG. 1 is a schematic depiction of an apparatus according to the present invention for measuring the contact position of a wire electrode and a workpiece in a wire cut electrical discharge machining device.
Figure 12A:
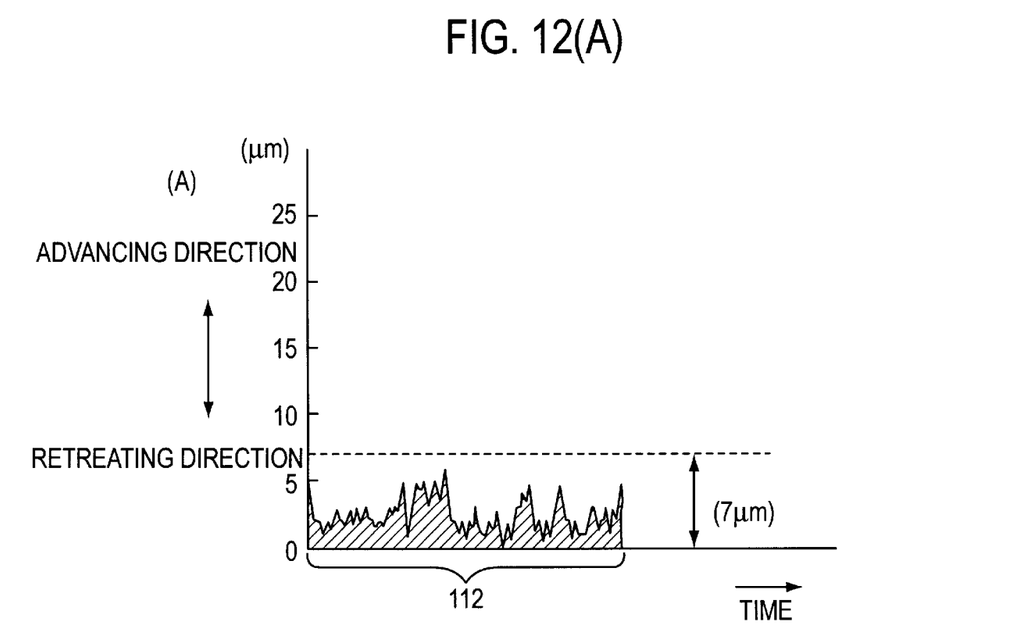
FIGS. 12(A) and 12(B) are graphs depicting coordinate data acquired by means of the contact position determination unit of FIG. 1.
Figure 12B:
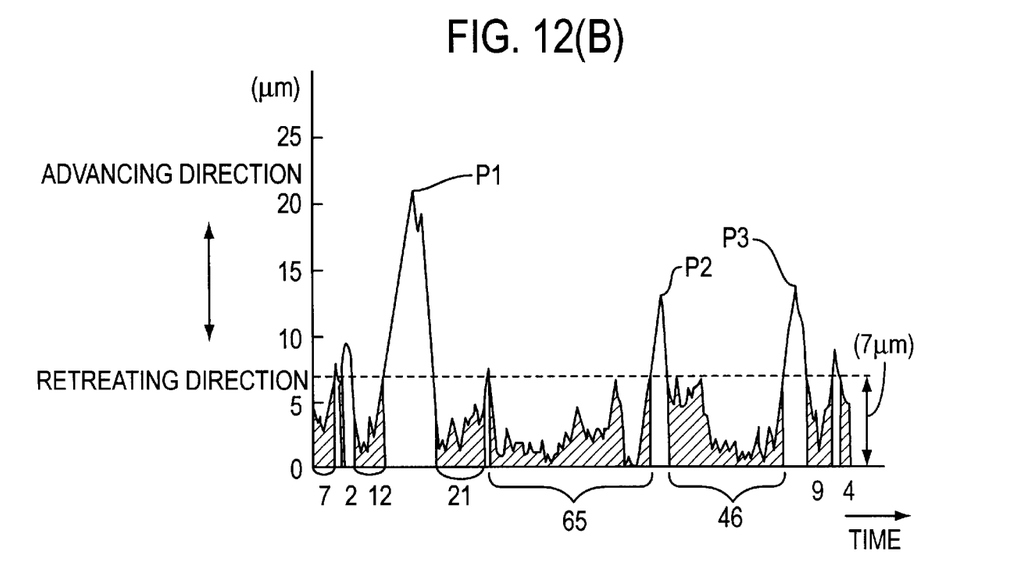

FIGS. 12(A) and 12(B) depict exemplary coordinate data received from the contact position determining unit 50 in FIG. 1. The "0" on the vertical axis indicates the reference coordinate in the reference coordinate memory section 54; the numbers on the horizontal axis indicate the size of the valid coordinate data. The region shaded by diagonal lines indicates the valid coordinate data. The coordinate data in FIG. 12(A) comprises all valid coordinate data. At the same time, the coordinate data in FIG. 12(B) comprises invalid coordinate data. In particular, at points P1, P2, and P3, the workpiece W is excessively close to the wire electrode 6. This excessive proximity may be due to insulating materials which have adhered to the surface of the wire electrode 6. The size of the valid coordinate data needed for contact position measurement requires a value of "112" in the example of FIG. 12(A), and cumulative value of "166" in FIG. 12(B). Thus, it should be understood that according to the contact position measurement method of the present invention, less time is required for contact position measurement when there is less invalid coordinate data.

Figure 13:
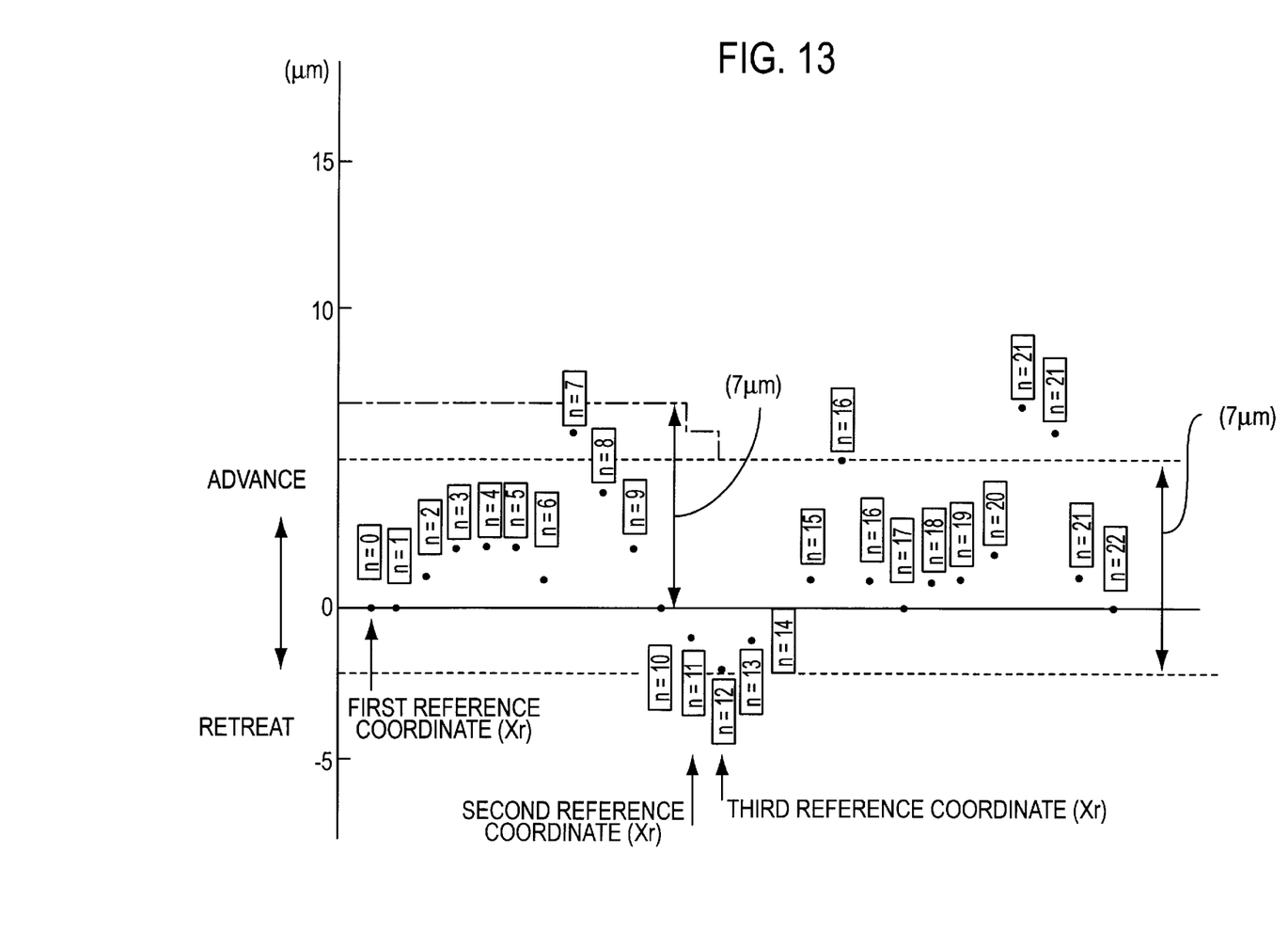
FIG. 13 is a graph showing a portion of the coordinate data acquired by means of the contact position determination unit of FIG. 1.

FIG. 13 depicts a portion of the coordinate data received by the contact position determining unit 50 in FIG. 1. The region of valid coordinate data determined by the third reference coordinate Xr is indicated by a dashed line. In the illustrated graph, the reference coordinate update section 74 updates the reference coordinate Xr with a coordinate smaller than Xr when n=1 and when n=12. Also, it will be seen that the coordinate data indicated by n=7 is moved from the valid data memory section 60 to the invalid data memory section 61 with the updating of reference coordinate Xr.

We claim:

1. A method for measuring a contact position of a wire electrode, which forms a tool, and said workpiece, a contact position measurement method comprising:

(a) positioning a wire electrode generally perpendicular to a plane in which either the wire electrode or the workpiece moves with respect to the other;

(b) applying a voltage between the wire electrode and the workpiece;

(c) moving either the wire electrode or the workpiece within the plane, whereby the wire electrode is caused to approach a reference position on the workpiece;

(d) detecting contact between the workpiece reference position and the wire electrode;

(e) positioning the workpiece reference position at approximately the center of vibration of the wire electrode as determined according to the number of occurrences of the detected contacts;

(f) generating coordinate data indicating the position of the wire electrode with respect to the workpiece, and;

(g) determining the contact position of the wire electrode with respect to the workpiece when the workpiece reference position has been placed at the center of the wire of vibration of the wire electrode as determined based on the coordinate data.

2. The contact position measurement method of claim 1, further comprising the step of categorizing the coordinate data into valid coordinate data and invalid coordinate data, and in which the step (g) further comprises the step of determining the contact position based on the size of the valid coordinate data.

3. The contact position measurement method of claim 1, further comprising the step of finding the variability of distribution of the coordinate data, and wherein the step (g) includes determining the position of contact based on the variability.

4. A contact position measurement device for measuring the position of a contact between a workpiece assigned a reference position and a wire electrode, the wire electrode comprising a tool positioned generally perpendicular to a plane in which either the wire electrode or the workpiece moves with respect to the other, the contact position measurement device comprising:

a voltage supply means for applying a voltage between the wire electrode and the workpiece;

a contact detection means for detecting contact between the wire electrode and the workpiece;

a moving means for moving either the workpiece or the wire electrode with respect to the other within the plane;

a position control means for controlling the moving means to position the workpiece reference position at the center of vibration of the wire electrode according to the number of the detected contacts;

a coordinate data generating means for generating the coordinate data which indicates the position of the wire electrode with respect to the workpiece, and;

a contact position determination means for determining the position of contact between the wire electrode and the workpiece based on the coordinate data.

5. The contact position measurement device of claim 4, which includes a means for categorizing the coordinate data into valid coordinate data and invalid coordinate data, and in which the contact position determining means determines the position of contact according to the size of the valid coordinate data.

6. The contact position measurement means of claim 4, further comprising a means for obtaining the variability of distribution of the coordinate data, and wherein the contact position determining means determines the position of contact based on the variability.

* * * * *